United States Patent
Hervieux et al.

(10) Patent No.: US 9,958,013 B2
(45) Date of Patent: May 1, 2018

(54) SPHERICAL BEARINGS

(71) Applicant: Goodrich Actuation Systems SAS, Buc (FR)

(72) Inventors: Arnauld R. E. Hervieux, Versailles (FR); Gregory Y. Meignat, Versailles (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 0 days. days.

(21) Appl. No.: 15/088,183

(22) Filed: Apr. 1, 2016

(65) Prior Publication Data
US 2016/0290407 A1   Oct. 6, 2016

(30) Foreign Application Priority Data
Apr. 3, 2015  (EP) .................................. 15305499

(51) Int. Cl.
| F16C 43/06 | (2006.01) |
| F16C 35/02 | (2006.01) |
| F16C 11/06 | (2006.01) |
| F16C 23/04 | (2006.01) |
| F16C 23/08 | (2006.01) |

(52) U.S. Cl.
CPC .......... F16C 43/06 (2013.01); F16C 11/0614 (2013.01); F16C 23/045 (2013.01); F16C 23/082 (2013.01); F16C 35/02 (2013.01)

(58) Field of Classification Search
CPC ..... F16C 43/02; F16C 11/0614; F16C 23/045
See application file for complete search history.

(56) References Cited

U.S. PATENT DOCUMENTS

| 1,348,023 | A | * | 7/1920 | McAvoy | .................. F16H 7/16 384/295 |
| 2,710,235 | A | * | 6/1955 | Olsen | ...................... F16C 35/02 384/263 |
| 3,516,136 | A | | 6/1970 | Carter | |
| 3,697,145 | A | | 10/1972 | Day, Jr. | |
| 4,909,639 | A | * | 3/1990 | Belanger | ................. F16C 33/20 384/295 |
| 5,265,965 | A | | 11/1993 | Harris | |
| 5,501,533 | A | | 3/1996 | Williams | |

(Continued)

FOREIGN PATENT DOCUMENTS

| WO | 2014161561 A1 | 10/2014 |
| WO | 2014161562 A1 | 10/2014 |

OTHER PUBLICATIONS

European Search Report for application No. EP15305499.4; dated Sep. 17, 2015, 8 pages.

*Primary Examiner* — Thomas R Hannon
(74) *Attorney, Agent, or Firm* — Cantor Colburn LLP

(57) ABSTRACT

An assembly comprises a component and a spherical bearing mounted in a bore of the component. The spherical bearing comprises an outer race received within the component bore, an inner spherical member mounted for rotation within the outer race and a releasable retaining element for releasably retaining the outer race in the component bore. The outer race and the component comprise interengaging indexing formations whereby said outer race may be mounted within said component bore in a plurality of angular positions relative to the longitudinal axis (A) of the component bore.

10 Claims, 5 Drawing Sheets

(56) References Cited

U.S. PATENT DOCUMENTS

| | | | | |
|---|---|---|---|---|
| 5,887,982 A | * | 3/1999 | Wilcher | F16C 35/02 |
| | | | | 384/247 |
| 6,312,162 B1 | * | 11/2001 | Castle | F16C 19/548 |
| | | | | 384/500 |
| 6,708,786 B2 | * | 3/2004 | Cariveau | E21B 10/22 |
| | | | | 175/363 |
| 8,562,237 B2 | * | 10/2013 | Pina Lopez | F16C 11/0614 |
| | | | | 384/206 |
| 2012/0237152 A1 | * | 9/2012 | Wheals | F16C 19/52 |
| | | | | 384/548 |

* cited by examiner

SPHERICAL BEARINGS

FOREIGN PRIORITY

This application claims priority to European Patent Application No. 15305499.4 filed on Apr. 3, 2015, the entire contents of which is incorporated herein by reference.

TECHNICAL FIELD

The present disclosure relates to spherical bearings, and in particular to assemblies incorporating such bearings and to methods for refurbishing such assemblies.

BACKGROUND

Spherical bearings are used in a wide variety of applications, for example applications in which it is necessary to accommodate misaligning and oscillatory movements between two components. The bearing typically comprises an outer body, or race, which receives a generally spherical inner member. The outer race is typically mounted to a first component and the inner member typically provided with a central bore for receiving a second component which will, in use, exhibit angular movement relative to the first component. The spherical inner member will accommodate such movement by rotation within the outer race. Such a bearing is disclosed, for example, in U.S. Pat. No. 3,516,136.

Typically the outer race is mounted in an opening in the second component and is retained in the opening by crimping, or, as shown in U.S. Pat. No. 3,516,136, by means of a clamping ring.

Frequently, it is necessary to replace spherical bearings due to wear. This can be a costly exercise as such bearings are expensive components. It would therefore be desirable to provide a spherical bearing which can be reused, even after wear.

SUMMARY

In a first aspect, there is disclosed herein an assembly comprising a component and a spherical bearing mounted in a bore of the component, the spherical bearing comprising: an outer race received within the component bore; an inner spherical member mounted for rotation within the outer race; and a releasable retaining element for releasably retaining the outer race in the component bore. In this embodiment, said outer race and said component comprise interengaging indexing formations whereby said outer race may be mounted within said component bore in a plurality of angular positions around the longitudinal axis of the component bore.

In such an assembly, rather than completely scrap and replace a spherical bearing when it becomes worn, it may be possible to reuse the bearing by rotating it in the component bore so as to move a worn section of the outer race to an angular position within the bore a position where it is expected that it will experience relatively little additional wear and move a relatively unworn section of the outer race to the position in which will experience more wear.

From a second aspect, therefore, there is disclosed herein a method of refurbishing an assembly as discussed above, the method comprising: removing or loosening the retaining element; disengaging the interengaging indexing features on the outer race and component; rotating the outer race relative to the longitudinal axis of the component bore so as to align said indexing features in a different relative angular orientation; reengaging the indexing features in the new orientation; and tightening the retaining element to retain the outer race to the component.

The interengaging elements may be provided in a number of ways. For example, the interengaging indexing formations formed on the component may be formed on a face thereof. These indexing formations may comprise one or more teeth projecting from said face.

The indexing formations may comprise a pair of opposed formations.

The interengaging indexing formations formed on said outer race may be formed in a radially projecting flange of the outer race. These indexing formations formed on the outer race may comprise one or more slots, for example through slots formed through the flange.

The formations provided on at least one of said outer race and the component may be equi-spaced.

For example, the formations may be spaced from one another at 20° to 90°, for example from 30° to 90°, for example at 45° from one another.

The retaining element may be a nut threaded onto an end of the outer race, and the spherical bearing may further comprise a locking element for locking the nut.

The locking element may be a locking washer comprising a plurality of deformable teeth formed on an outer periphery thereof for engagement with corresponding slots formed in the outer periphery of the locking nut, and a locating tab formed on a bore portion of the washer for engagement with a keyway provided on the outer race.

From a further aspect, there is also disclosed herein a spherical bearing comprising: an outer race; an inner spherical member mounted for rotation within the outer race; a locknut threaded onto an end of said outer race for releasably retaining the outer race in a component bore and having a plurality of slots formed in an outer periphery of the locking nut; and a locking washer comprising a plurality of deformable teeth formed on an outer periphery thereof for engagement with the slots formed in the outer periphery of the locking nut, and a locating tab formed on a bore portion of the washer for engagement with a keyway provided on the outer race. The outer race further includes a plurality of slots formed in a radially extending flange thereof.

With such a bearing, when refurbishing the assembly, the refurbishing method may comprise: releasing the locking washer to permit removal of said locking nut; and replacing said locking washer when retightening the locking nut.

The refurbishment method may further include the step of marking one or more of the indexing features so as to indicate which in the features have already been engaged in a given orientation. For example, indexing slots which have already been engaged with an indexing tooth may be marked as such to avoid the spherical bearing being reinstalled in that orientation again.

The method of the disclosure is not, however, limited to use with the above bearing construction having indexing formations, and from a further aspect, the disclosure provides a method of refurbishing an assembly comprising a component and a spherical bearing mounted in a bore of the component, the spherical bearing comprising: an outer race received within the component bore; an inner spherical member mounted for rotation within the outer race; and a releasable retaining element for releasably retaining the outer race in the component bore. The methods includes removing or loosening the retaining element, rotating the outer race relative to the longitudinal axis of the component bore so as to align said outer race in a different angular orientation within the component bore, and tightening the retaining element to retain the outer race to the component.

In this case, the mounting of the bearing outer race itself is sufficient to retain the outer race in the desired angular orientation.

BRIEF DESCRIPTION OF DRAWINGS

An exemplary, non-limiting embodiment of the disclosure will now be described with reference to the accompanying drawings in which.

DETAILED DESCRIPTION

Figure 1:
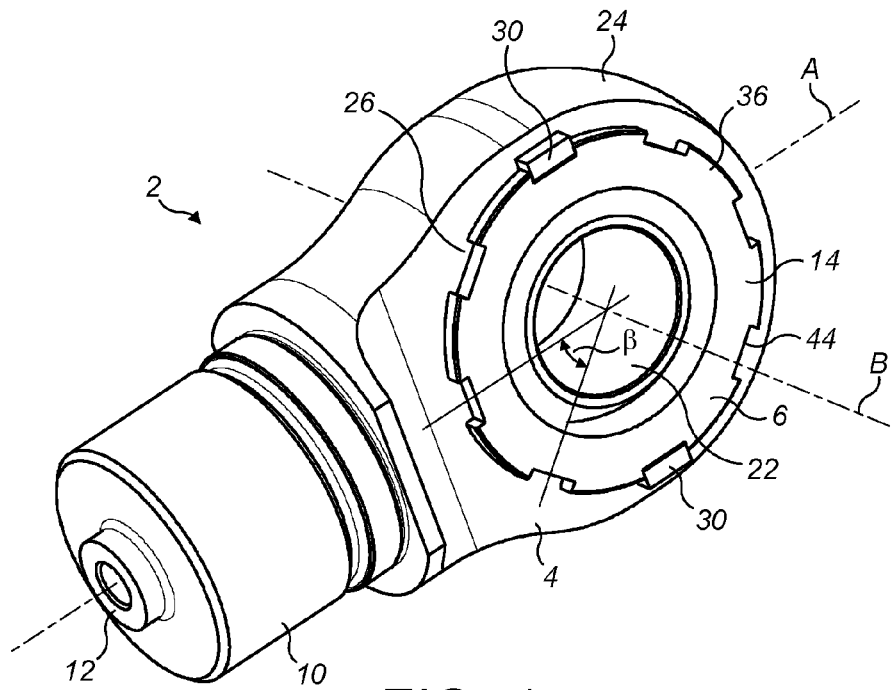
FIG. 1 is a front perspective view of an assembly in accordance with the disclosure.
Figure 2:
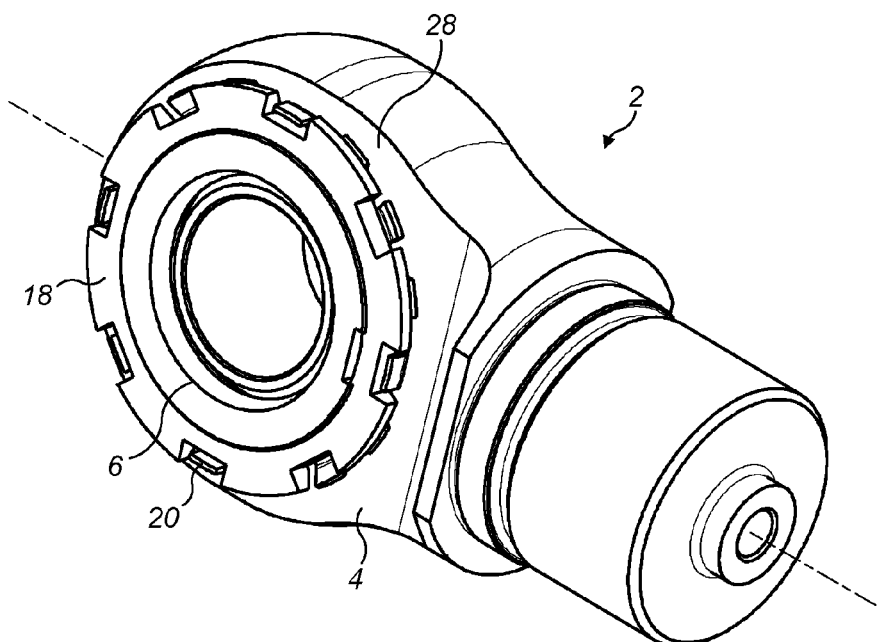
FIG. 2 is a rear perspective view of the assembly of FIG. 1.

FIG. 1 shows an assembly 2 which comprises a component 4 and a spherical bearing 6 received within a bore 8 (see FIG. 7) of the component 4. The component 4 has a cylindrical mounting portion 10 which is mounted to a further structure (not shown). The mounting portion 10 comprises a bore 12 for receiving a fastener for attaching the component 4 to the further structure.

As will be described in further detail below, the spherical bearing 6 comprises an outer race 14, an inner spherical member 16, a retaining element in the form of a locking nut 18 and a locking washer 20. A liner (not shown) may be provided between the outer race 14 and the inner spherical member 16, as is well known in the spherical bearing art. The inner spherical member 16 comprises a bore 22 for receiving a further component (not shown) which will be subjected to angular movements relative to the component 4. Further details of the spherical bearing 4 will be given below.

The component 4 may, in use, be subject to reciprocating movements in the direction along the longitudinal axis A of the component 4. For example, the component 4 may be attached to an actuator which reciprocates so as to provide an actuating movement to the further component received within the bore 8 of the inner spherical member 16 of the spherical bearing 6. One such application may be, for example, in a helicopter system, for example in a helicopter swash plate system. In that application, the component 4 may cooperate with a lever arm which acts to change the pitch angle of the rotor blade.

Figure 3:
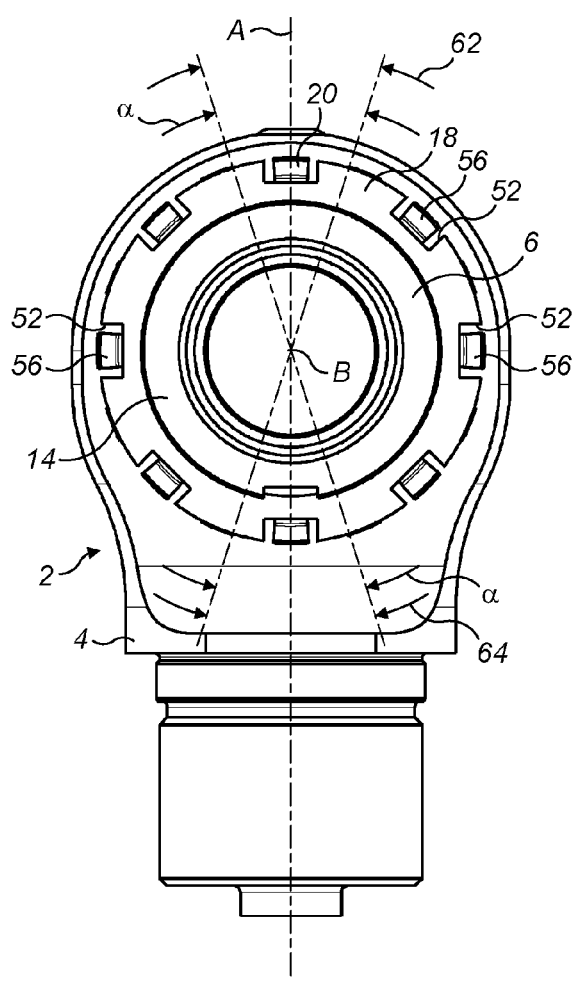
FIG. 3 is a rear view of the assembly of FIG. 1.
Figure 4:
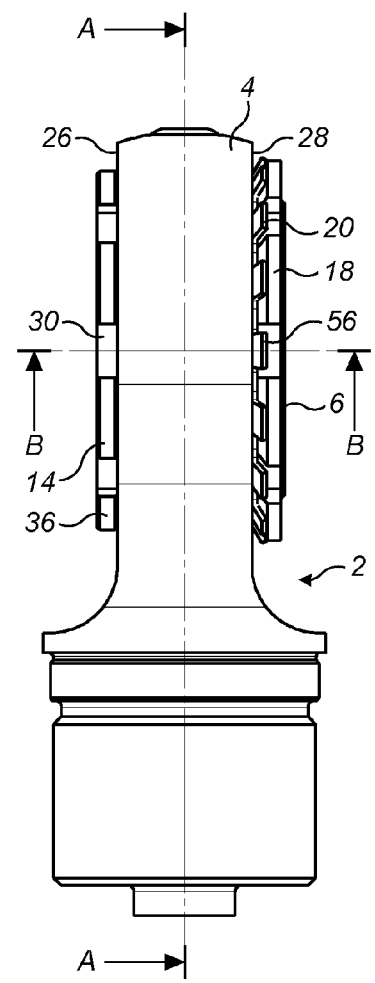
FIG. 4 is a side view of the assembly of FIG. 1.
Figure 5:
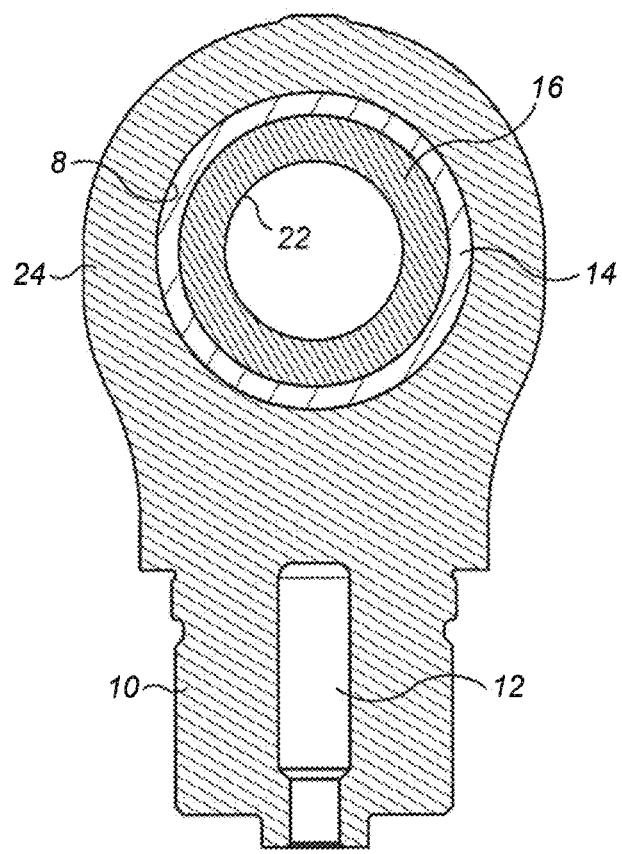
FIG. 5 is a sectional view taken along line A-A of FIG. 4.

The Applicant has recognised that in situations such as this, wear on the spherical bearing 6 may not be uniform. In particular, the wear experienced by the spherical bearing 6 may be particularly pronounced in areas lying along the line of applied force. In particular, as illustrated in FIG. 3, the wear may occur in opposed areas 62, 64 of the spherical bearing 6. Typically wear will occur over an angular range α relative to the longitudinal axis A of the component 4. In some cases the angle α may be about 30°, i.e. ±15° about the axis A.

In bearings to date, when the wear on the spherical bearing 6 becomes too high, the whole bearing has been replaced. However, this is a very costly exercise and it is therefore desirable to reduce the cost of maintenance.

The Applicant has recognised that due to the wear occurring in the spherical bearing 6 over a limited angular range, it is not in fact necessary to replace the entire bearing. Rather, it is possible to re-use the bearing. As will be described below, in accordance with this disclosure, the spherical bearing 6 and component 4 have been designed so as to permit the re-use, rather than the scrapping of the spherical bearing 6.

Figure 7:
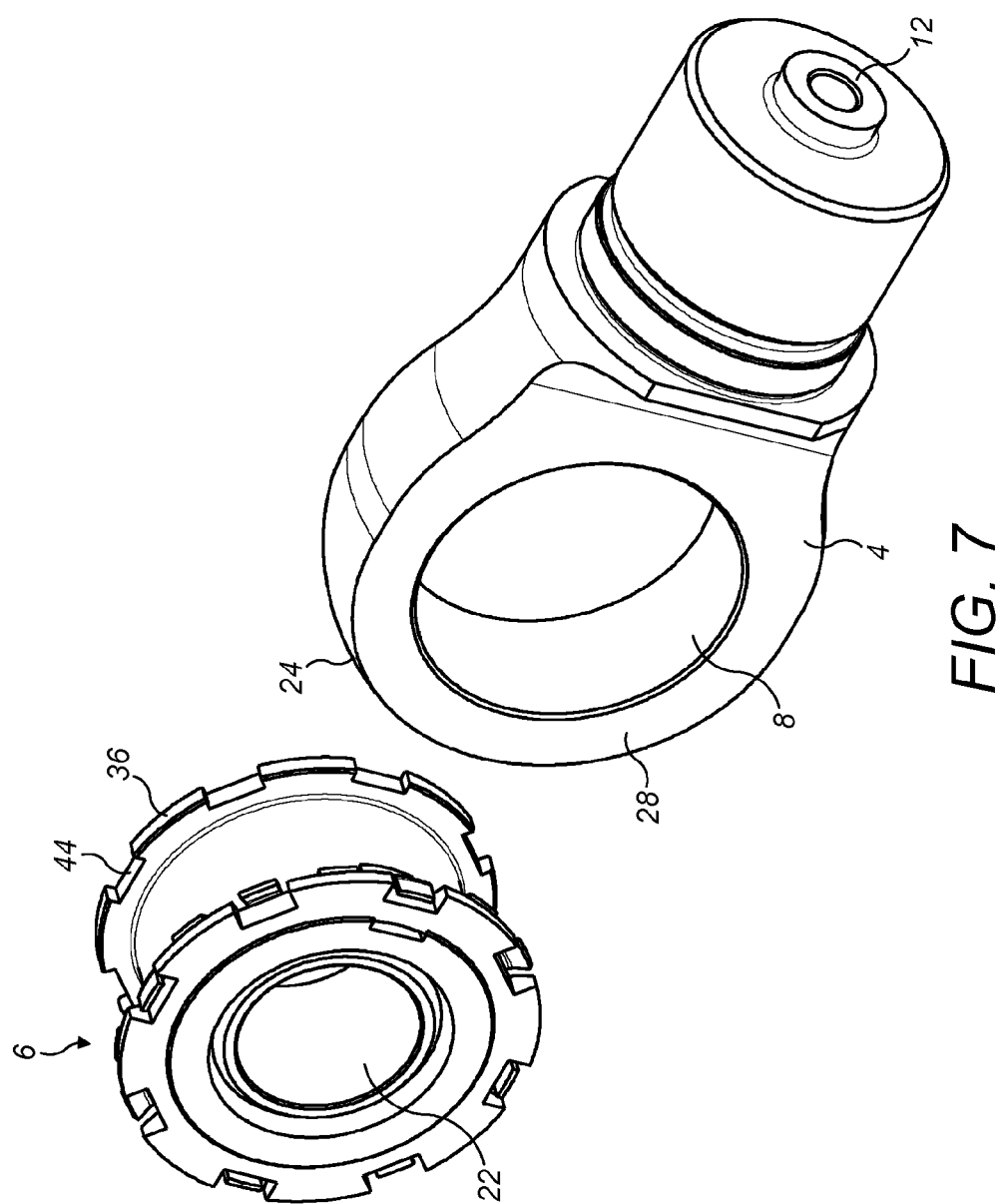
FIG. 7 is an exploded view of the assembly of FIG. 1.
Figure 8:
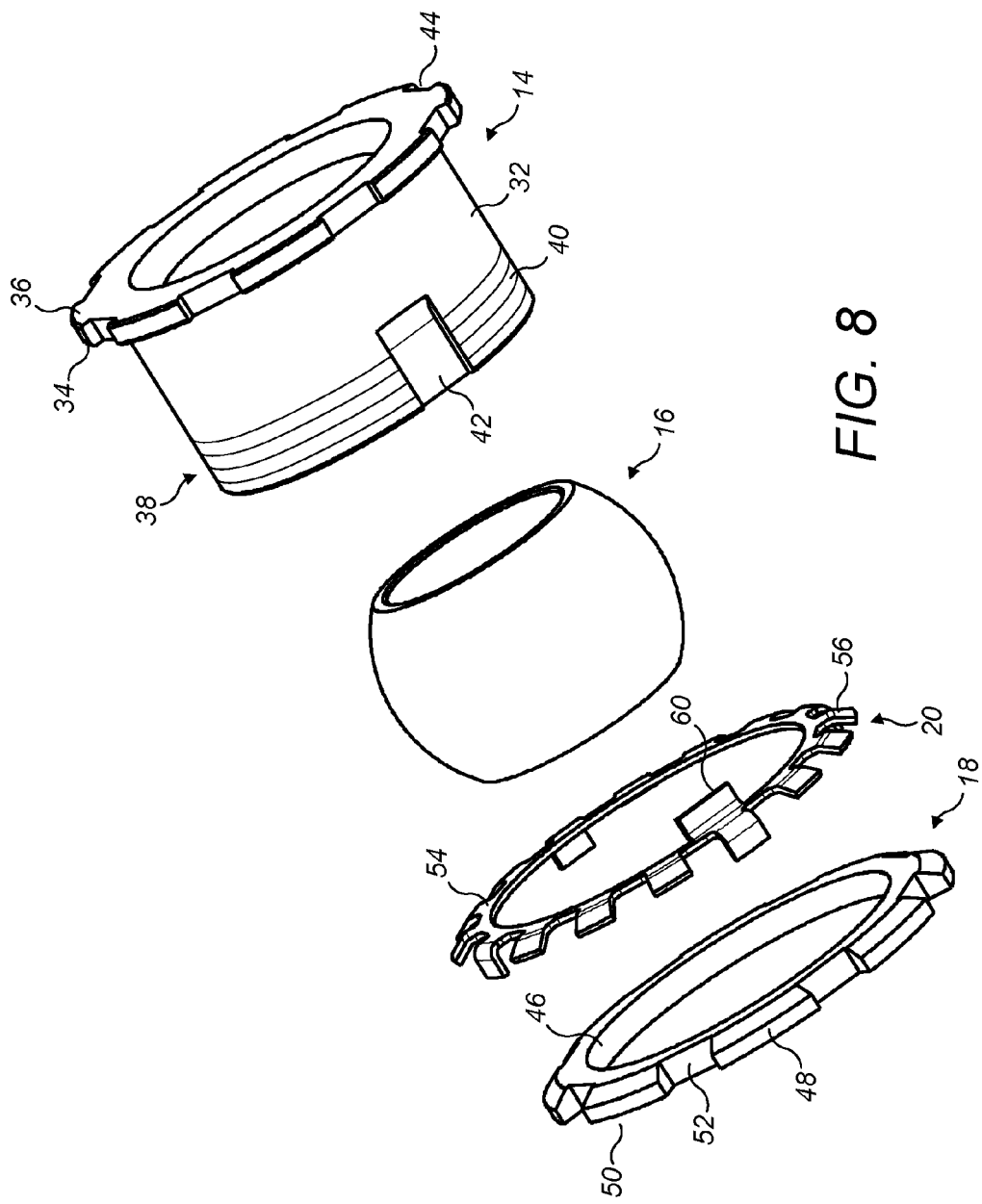
FIG. 8 is an exploded view of the spherical bearing of the assembly of FIG. 1.

Describing the component 4 and spherical bearing 6 in more detail now, the component 4 comprises an eye-like body 24 having parallel front and rear faces 26, 28. The bore 8 of the component 4 extends between the front and rear faces 26, 28. The rear face 28 is planar as shown in FIG. 7, but the front face 26 is provided with a pair of teeth 30 which project forwardly from the front face 26 on either side of the bore 8.

Although there are two teeth 30 illustrated in this embodiment, the disclosure is not limited to such, and any number of teeth 30 may be provided on the front face 26. Moreover, although in this embodiment the teeth 30 are shown as being provided in diametrically opposed positions on the front face 26, again this is not essential, and the teeth may be provided in any desired relative orientation. Moreover, it would also be possible to provide just a single tooth 30.

The spherical bearing 6 comprises four components namely the outer race 14, the inner spherical member 16, a locking nut 18, and a locking washer 20. The spherical inner member 16 is received within a spherical seat provided in the outer race 14.

The outer race 14 has a generally cylindrical body 32 which is received within the component bore 8. A first, forward end 34 of the outer race body 32 is provided with a radially extending flange 36. A second, rear end 38 of the outer race body 32 comprises a threaded section 40, with a keyway slot 42 extending axially along the outer surface of the outer race body 32 away from the rear end 38 thereof.

The radially extending flange 36 is provided with a plurality of, in this embodiment eight, slots 44 equi-spaced around its periphery. The slots 44 are dimensioned so as to be closely locatable over the teeth 30 of the component 4 when the outer race 14 is inserted through the front face 26 of the component 4. In this embodiment, the slots 44 have a constant, rectangular cross section and extend completely through the radially extending flange 36.

As will be apparent, for example from FIG. 1, the outer race 14 may therefore be located in a plurality of predetermined angular orientations relative to the axis B of the bore 8 of the component. The teeth 30 and the slots 44 therefore together constitute interengaging indexing formations.

As illustrated in FIG. 3, the slots 44 are spaced apart from one another around the longitudinal axis B of the outer race 14 by an angle β. In this embodiment, there are eight slots, so β=45°. However, the angle β is chosen with regard to the angle α of wear expected to be experienced in the spherical bearing 6.

The locking nut 18 is provided with a threaded bore 46 for threading engagement with the threaded section 40 of the outer race body 32. It is provided with a plurality, in this embodiment eight, teeth 48 projecting from its outer periphery 50 thereby defining a plurality of slots 52.

Figure 6:
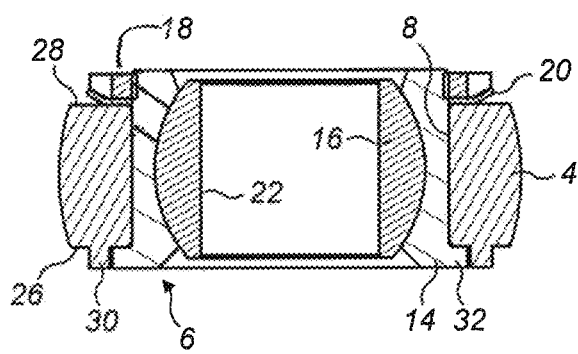
FIG. 6 is a cross-sectional view taken along line B-B of FIG. 4.

The locking washer 20 comprises a central bore 54 dimensioned to engage over the outer race body 32 between the locking nut 18 and the rear face 28 of the component 4, as shown in FIG. 6. The locking washer 20 is further formed with a plurality, in this embodiment sixteen, teeth 56 extending radially outwardly from the outer periphery 58 of the locking washer 20.

The locking washer 20 further comprises a locating tab 60 which extends axially forwardly from the bore 54 of the locking washer 20. The locating tab 60 is dimensioned so as to be receivable within the keyway 42 formed in the outer race body 32 so as to locate the locking washer 20 rotationally with respect to the outer race body 32. The material of the locking washer 20 is such that the locking teeth 56 may be deformed into the slots 52 of the locking nut 18. The locking washer 20 may be a metallic component, for example a stamped component.

The assembly of the spherical bearing 6 into the component 4 will now be described.

The spherical bearing 6 is mounted to the component 4 by inserting the cylindrical body 32 of the outer race 14 into the bore 8 of the component 4 through the front face 26 of the component body 24. The outer race 14 is indexed into a desired angular orientation with respect to the axis B of the component bore 8 by rotating the outer race 14 around the axis B before the outer race 14 is fully engaged within the bore 8. Of course, when the spherical bearing 6 is new it may be installed in any angular orientation. When the outer race 14 has been indexed to the appropriate angular position, the outer race 14 may be fully inserted into the bore 8 such that the teeth 30 provided on the front face 26 of the component body 24 engage with an opposed pair of opposed slots 44 in the flange 36 of the outer race 14.

The locking washer 20 may then be mounted over the rear end 38 of the outer race body 32 with the locating tab 60 of the locking washer 20 received in the keyway 42 of the outer race body 32. This locates the locking washer 20 angularly relative to the outer race body 32.

Finally, the locking nut 18 may be threaded onto the threaded portion 40 of the cylindrical body 32 of the outer race 14 and tightened against the rear face 28 of the component body 24 so as to firmly locate the outer race 14 in position within the component 4. When the locking nut 18 has been tightened to the appropriate degree, the locking teeth 56 of the locking washer 20 may be deformed into the slots 52 formed in the locking nut 18 so as to prevent the locking nut 18 from unscrewing from the threaded portion 40 of the outer race body 32. As there are more, in this case two times as many, locking teeth 56 provided on the locking washer 20 as there are slots 52 provided on the locking nut 18, locking can be achieved without either over tightening or under tightening the locking nut 52.

In use, as mentioned above, the component 4 may be subject to reciprocating movement along the axis A of the component 4. This may produce particularly high wear forces in the regions 62, 64 of the spherical bearing 4. These areas of wear, as explained above, typically extend over an angular range α of typically ±15° relative to the axis A. The wear on the other parts of the bearing 6 may not be as high. In use, therefore, it is wear in the areas 62, 64 which will determine when maintenance action must be performed upon the assembly.

As discussed above, the present disclosure permits the re-use, rather than the scrapping of a spherical bearing 6 in maintenance. In particular, since the spherical bearing 6 may be indexed relative to axis B the central bore 8 of the component 4, it may be rotated relative to that axis B in order to bring a less worn region of the spherical bearing 6 into the recognised wear regions 62, 64. In this particular example, since the indexing features, i.e. the slots 44 on the outer race 14, are spaced apart by 45° from one another, by indexing the inner race through 45°, wear of ±22.5° relative to the axis A can be accommodated, since indexing the outer race 14 through 45° will bring a lesser worn area into the areas 62, 64.

The maintenance process employing this technique will now be discussed.

When it is determined that an undesirable level of wear has been experienced in the bearing 6 (for example empirically or through appropriate measurements), the assembly 2 will require maintenance. In this event, the locking teeth 56 of the locking washer 20 are deformed out of engagement with the locking nut slots 52 to allow the locking nut 18 to be loosened and if necessary completely removed. The locking washer 20 can then also be removed.

This will allow the outer race 14 to be either fully or partially removed from the bore 8 of the component 4 and indexed, for example by 45°, so as to bring a new pair of flange slots 44 into alignment with the teeth 30 of the outer race body 24. The outer race 14 may then be fully re-inserted into the component bore 4, and the same, or a new locking washer 20 mounted to the rearward end of the inner race body 32 and the locking nut 18 once more threaded onto the threaded portion 40 of the outer race body 32 and tightened. The locking nut 18 can then be locked in position by deforming the teeth 56 of the (new) locking washer 20.

Thus, compared to other repair processes in which the whole spherical bearing 6 had to be replaced, in accordance with this disclosure, at most only the locking washer need be replaced. This represents a very significant cost saving over existing processes.

In the illustrated embodiment, the spherical bearing 6 may be used in four indexed positions, assuming that the wear regions 62, 64 are less than 45°. The number of flange slots 44 may be chosen as appropriate in consideration of the expected angular extent of the wear area 62, 64.

It may be advantageous in some circumstances to mark the slots 44 on the flange 36 of the outer race body 32 to indicate which slots 44 have already been aligned with the teeth 30 of the component body 24. This will avoid inadvertent installation of the outer race 14 in an already worn position.

It will be understood that the above description is of an exemplary embodiment only and that modifications may be made thereto without departing from the scope of the disclosure.

For example, the indexing formations 30, 44 provided on the outer race 14 and component body may take a different form from those described. For example, holes or other apertures may be provided instead of slots 44, with an appropriately shaped tooth or teeth being provided on the component body. Moreover the indexing formations need not be provided on a face of the component, but may be arranged, for example, at least partially within the component bore 8. The number and arrangement of the indexing formations may also very from those illustrated. What is important is that the indexing formations permit the outer race to be located in the component bore in a number of distinct indexed positions.

In addition, other retaining means may be used. For example, locking means other than a locking washer 20 may be used, provided they can be released to allow removal of the locking nut 18.

Moreover, the retaining element 18 need not be a lock nut, and may be any element which is suitable for retaining the outer race 14 in the component bore 8.

In addition, it may not be necessary to provide interengaging indexing formations on the outer race 14 and component body 24 and the clamping effect of the retaining element 18 are such as to maintain the outer race 14 in the desired angular position. In that case, the outer race 14 may simply be indexed to a new desired angular position and secured in that position by the retaining element 18. The outer race 14 and/or component body 24 may be suitably marked to indicate relative orientations of the components to avoid them being aligned in an orientation where wear has already been experienced.

The invention claimed is:

1. An assembly comprising a component and a spherical bearing mounted in a bore of the component, the spherical bearing comprising:
   an outer race received within the component bore;
   an inner spherical member mounted for rotation within the outer race; and
   a releasable retaining element for releasably retaining the outer race in the component bore; wherein:
   said outer race and said component comprise interengaging indexing formations whereby said outer race may be mounted within said component bore in a plurality of angular positions relative to the longitudinal axis (A) of the component bore;
   said interengaging indexing formations formed on said component are formed on a face thereof; and
   wherein said indexing formations comprise one or more teeth projecting from said face.

2. An assembly as claimed in claim 1, comprising a pair of opposed teeth.

3. An assembly as claimed in claim 1, wherein said interengaging indexing formations formed on said outer race are formed in a radially projecting flange of the outer race.

4. An assembly as claimed claim 3, wherein said indexing formation formed on said outer race comprise one or more slots.

5. An assembly as claimed in claim 1, wherein the indexing formations provided on at least one of said outer race and said component are equi-spaced.

6. An assembly as claimed in claim 5, wherein the formations are spaced at 20° to 90° from one another.

7. An assembly as claimed in claim 5, wherein the formations are spaced at from 30° to 90° from one another.

8. An assembly as claimed in claim 5, wherein the formations are spaced at 45° from one another.

9. An assembly as claimed in claim 1, wherein the retaining element is a nut threaded onto an end of the outer race, and wherein the spherical bearing further comprises a locking element.

10. An assembly as claimed in claim 9, wherein the locking element is a locking washer comprising a plurality of deformable teeth formed on an outer periphery thereof for engagement with corresponding slots formed in the outer periphery of the locking nut, and a locating tab formed on a bore portion of the washer for engagement with a keyway provided on the outer race.

* * * * *